(12) United States Patent
Skidmore et al.

(10) Patent No.: US 6,755,188 B2
(45) Date of Patent: Jun. 29, 2004

(54) CONVERTIBLE GRILL AND FIREPLACE

(75) Inventors: Keith Vincent Skidmore, Newton, KS (US); Jordan Gabriel Rockstad, Andover, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 10/213,055

(22) Filed: Aug. 5, 2002

(65) Prior Publication Data

US 2004/0020484 A1 Feb. 5, 2004

(51) Int. Cl.$^7$ .............................................. F24B 01/181
(52) U.S. Cl. .............................. 126/25 R; 126/304 R; 126/519
(58) Field of Search ......................... 126/25 R, 9 R, 126/304 R, 519

(56) References Cited

U.S. PATENT DOCUMENTS

| | | |
|---|---|---|
| 610,555 A | 9/1898 | McNamee |
| 1,279,033 A | 9/1918 | Stollberg |
| 2,619,951 A | 12/1952 | Kahn |
| D178,875 S | 10/1956 | Faust |
| 2,962,019 A | 11/1960 | Lundgren |
| D192,491 S | 3/1962 | Crownover |
| 3,096,706 A | 7/1963 | Cardwell |
| 3,105,483 A | 10/1963 | Bryan |
| D200,137 S | 1/1965 | Hanna |
| 3,220,400 A | 11/1965 | Yager |
| 3,230,948 A | 1/1966 | Schmitt |
| 3,369,482 A | 2/1968 | Kahn et al. |
| 3,421,433 A | 1/1969 | Vitale |
| 3,455,291 A | 7/1969 | Glass |
| 3,494,349 A | 2/1970 | Allen |
| 3,499,432 A | 3/1970 | Hannebaum |
| 3,809,058 A | 5/1974 | Becker |

(List continued on next page.)

FOREIGN PATENT DOCUMENTS

| | | |
|---|---|---|
| DE | 2916-090 | 10/1979 |
| GB | 397287 | 8/1933 |

OTHER PUBLICATIONS

"Backyard Max: Installation Instructions", GSW, 4 pgs (Mar. 1994).
"Coleman Outdoor Fireplace: Assembly and Instructions Manual", Model 5067–70, 5 pgs (Sep. 1996).
"Weber Barbecue Catalog: Barbecue Grills and Smokers", pp. 14–15 (1984).

*Primary Examiner*—Henry Bennett
(74) *Attorney, Agent, or Firm*—Leydig, Voit & Mayer, Ltd.

(57) ABSTRACT

A convertible grill and fireplace having a single firebox and lid, both of which may be used in both a grill configuration and a fireplace configuration. A detachable and foldable screen assembly is used in the fireplace configuration. The screen assembly fits between the firebox and the lid, and includes a series of panels that may be folded together to form a compact unit. Successive panels of the screen assembly are shorter in length so that they may be folded into one another. This feature permits the screens to be folded into a compact configuration, even if the screen assembly and the convertible grill and fireplace have a circular cross-section. The convertible grill and fireplace also includes retractable legs so that the firebox may be lowered or raised as desired.

29 Claims, 6 Drawing Sheets

U.S. PATENT DOCUMENTS

| | | | |
|---|---|---|---|
| 3,981,292 | A | 9/1976 | Lilly et al. |
| 3,999,472 | A | 12/1976 | Einto |
| 4,112,913 | A | 9/1978 | Shimek et al. |
| 4,120,237 | A | 10/1978 | Mecherlen |
| 4,167,177 | A | 9/1979 | Wiggins |
| 4,216,760 | A | 8/1980 | Wiggins |
| 4,233,890 | A | 11/1980 | Jansen |
| 4,273,096 | A | 6/1981 | Hannebaum |
| 4,332,235 | A | 6/1982 | Hannebaum |
| 4,498,452 | A | 2/1985 | Schlosser et al. |
| D284,929 | S | 8/1986 | Schlosser et al. |
| 4,688,542 | A | 8/1987 | Isbell |
| 4,706,817 | A | 11/1987 | Greathouse |
| D293,191 | S | 12/1987 | Stephen et al. |
| 4,726,349 | A | 2/1988 | Gehrke |
| 4,899,725 | A | 2/1990 | Barron, Jr. |
| 5,094,223 | A | 3/1992 | Gonzalez |
| 5,421,321 | A | 6/1995 | Ward |
| D375,347 | S | 11/1996 | Whalen et al. |
| 5,596,980 | A | 1/1997 | Whalen et al. |
| 5,598,834 | A | 2/1997 | Grady |
| 5,832,915 | A * | 11/1998 | Skidmore et al. ............ 126/9 |
| 5,836,298 | A | 11/1998 | Grady |
| 5,960,788 | A * | 10/1999 | Bach et al. ............ 126/506 |
| D420,115 | S | 2/2000 | Bach et al. |
| 6,131,560 | A | 10/2000 | Healy |
| 6,142,143 | A | 11/2000 | Martin |
| 6,220,240 | B1 | 4/2001 | Grady et al. |
| 6,286,503 | B1 | 9/2001 | Bach et al. |
| 6,321,640 | B1 | 11/2001 | Tseng |
| 2001/0032642 | A1 | 10/2001 | Bach et al. |

* cited by examiner

CONVERTIBLE GRILL AND FIREPLACE

TECHNICAL FIELD OF THE INVENTION

The present invention is directed to grills, and more specifically to outdoor grills that utilize charcoal.

BACKGROUND OF THE INVENTION

Camping is a popular recreational activity enjoyed by many. Some people camp so that they may enjoy the outdoors, and others use camping as an inexpensive alternative to staying in hotels.

Although many campers enjoy being in the outdoors, often campers like to enjoy the luxuries of home while camping. For example, many campers bring lounge chairs or hammocks, portable air mattresses or cots, and similar items to make a camping experience more comfortable.

One thing that most campers enjoy while camping is sitting around a fire. People often also enjoy fires in their back yards, and utilize outdoor fireplaces for this purpose. The outdoor fireplaces usually raise a fire off the ground, contain the fire to avoid fire hazards, and restrict the mess of the fire to a confined space. Because users become used to the convenience of the outdoor fireplaces, they often may want to take them for camping or other away-from-home outdoor activities. However, many of the outdoor fireplaces are bulky, large, and have limited portability, so that many campers find them difficult to bring to a camping site.

Another activity that campers often enjoy is cooking on an open fire. Typically, at home, campers will use a grill for this purpose. However, many conventional grills do not fold down to a convenient size, so their portability and use for camping is limited.

SUMMARY OF THE INVENTION

The present invention provides a single unit that is convertible between a grill and an outdoor fireplace. To this end, the convertible grill and fireplace includes a single firebox and lid, both of which may be used in both a grill configuration and a fireplace configuration. The convertible grill and fireplace may be used in a home environment, such as on a patio. In addition, the convertible grill and fireplace may be easily and compactly stored so it may be transported to and used at a remote location, such as a campsite.

In accordance with one aspect of the present invention, a detachable and foldable screen assembly is used in the fireplace configuration. The screen assembly fits between the firebox and the lid, and includes a series of panels that may be folded together to form a compact unit. To this end, the successive panels of the screen assembly are shorter in length so that they may be folded into one another. This feature permits the screens to be folded into a compact configuration, even if the screen assembly and the convertible grill and fireplace have a circular cross-section.

In accordance with another aspect of the present invention, the convertible grill and fireplace includes legs that extend and retract. In this manner, the legs may be extended for the grilling configuration so that a grill surface is positioned at a comfortable level for a user. In addition, the legs may be retracted for the fireplace configuration so that a fire is easily accessible for adding firewood and so that the fire is at a comfortable level for users to enjoy the fireplace.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 1:
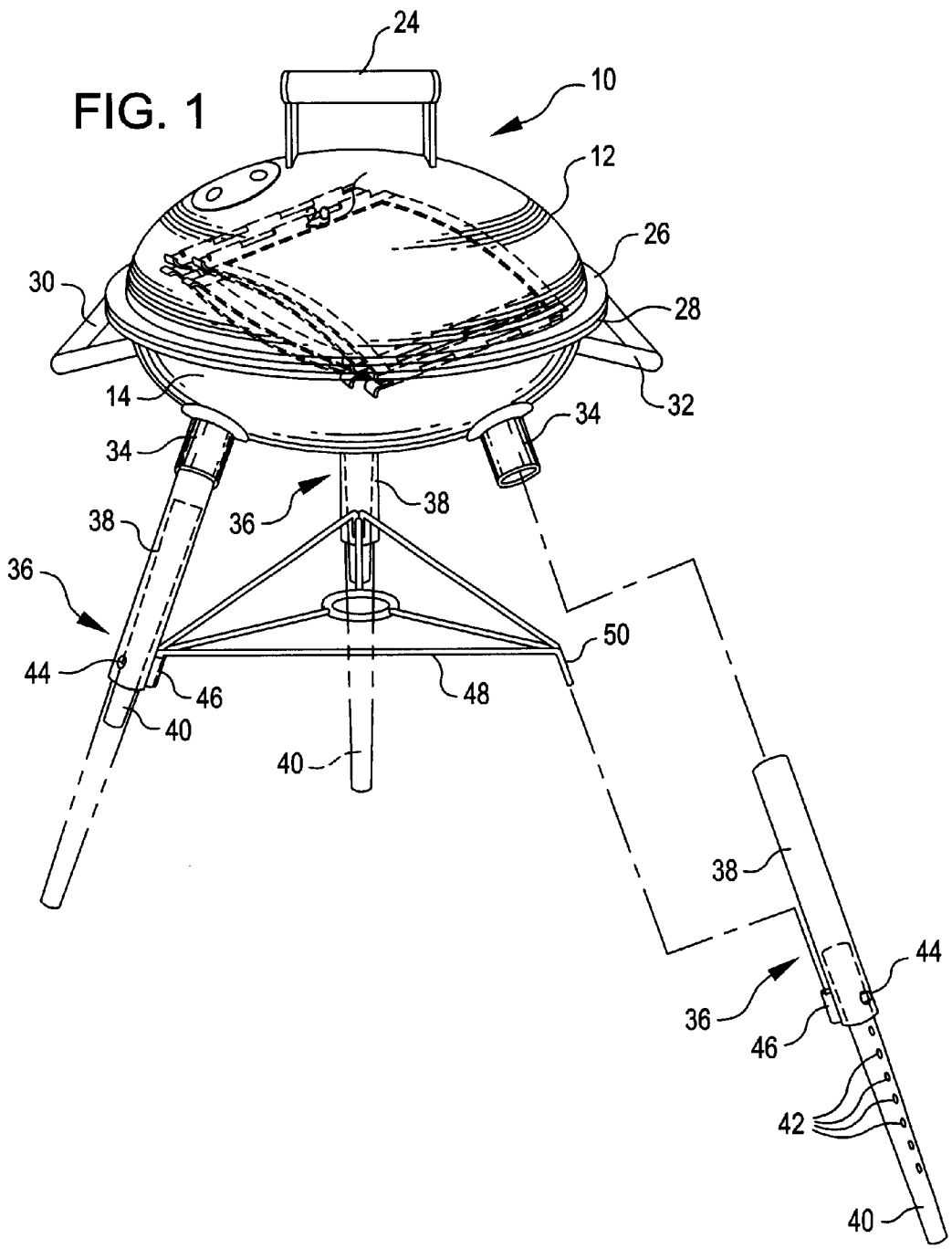
FIG. 1 is an isometric view of a convertible grill and fireplace made in accordance with the present invention, with one leg of the convertible grill and fireplace removed for detail, and with the convertible grill and fireplace shown in a grill position.
Figure 7:
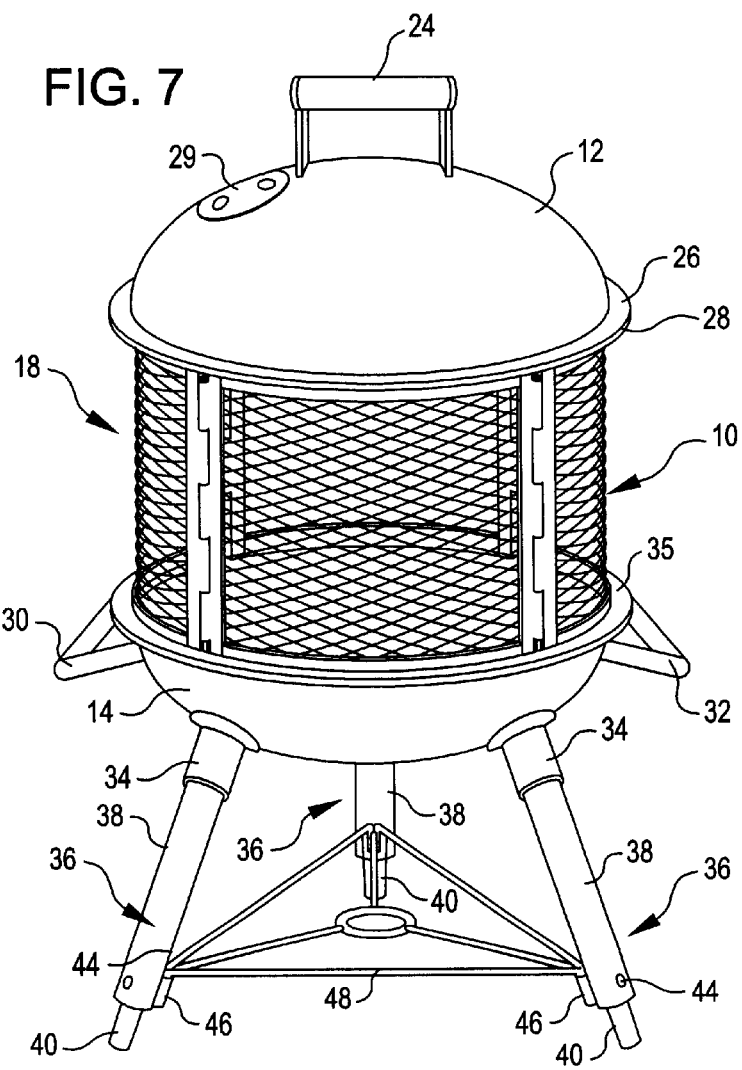
FIG. 7 is a side perspective view of the convertible grill and fireplace of FIG. 1, with the convertible grill and fireplace in a fireplace configuration, and with the legs retracted.

Referring now to the drawings, in which like reference numerals represent like parts throughout the several views, FIG. 1 shows a convertible grill and fireplace 10 in accordance with the present invention. Briefly described, the convertible grill and fireplace 10 is reconfigurable between a grill configuration, shown in FIG. 1, to a fireplace configuration, shown in FIG. 7.

The convertible grill and fireplace 10 includes a lid 12. In the grill configuration of FIG. 1, the lid 12 rests on top of a firebox 14. A cooking grate 16 (FIG. 2) rests just inside and at the top surface of the firebox 14 when the convertible grill and fireplace 10 is in the grill configuration. The cooking grate 16 is removed for the fireplace configuration (FIG. 7), and a screen assembly 18 is mounted between the lid 12 and the firebox 14.

The lid 12 is round, and has parabolic sides that taper downward from a handle 24 at the top to an outer rim 26. By parabolic, we mean that the radius of curvature changes from the top to the bottom, and in this case is more curved (shorter radius) near the firebox than at the top, although other arrangements may be used. The rim 26 extend horizontally outward from the bottom of the lid 12, and turns downward at its outer edges to form a lip 28. A damper 29 is located at the top of the lid 12 spaced a few inches (e.g., 5) from the handle 24.

The firebox 14 is also round and has sloped, parabolic sides. Handles 30, 32 are located on opposite sides of the firebox 14, and provide a convenient manner in which to lift the firebox 14. A charcoal grate 33 (FIG. 9) may be provided that rests at the bottom of the firebox 14 and that spaces charcoal or wood that is to be burned in the firebox 14 from the bottom surface of the firebox 14.

In the embodiment shown in the drawings, three leg receptors 34 extend downward and outward from sides of the firebox 14. The leg receptors 34 are hollow cylinders that are welded or otherwise connected to the bottom of the firebox 14. The firebox 14 includes a rim 35 along its upper outer edges.

In accordance with one aspect of the present invention, the convertible grill and fireplace 10 includes telescoping legs 36. The telescoping legs 36 fit into the leg receptors 34 on the bottom of the firebox 14 when the convertible grill and fireplace 10 is fully assembled. If desired, each of the telescoping legs 36 may be snapped into or otherwise connected to the respective leg receptor 34. For example, a spring clip (not shown) may be provided on the leg receptor 34 for snapping the respective telescoping leg 36 into place.

The telescoping legs 36 include an upper section 38 and a lower section 40. The upper section 38 is hollow and cylindrical in shape, and the lower section 40 is an elongate tube that fits into the upper section 38. Holes 42 extend along the length of the lower section 40. A spring clip 44 or a pair of spring clips are provided on a lower portion of the upper section 38. In operation, a user depresses the spring clip 44 and adjusts the lower section 40 of the respective telescoping leg 36 relative to the upper section 38 of the respective telescoping leg 36. When the lower section 40 has been extended or retracted a desired amount, the user releases the spring clip 44 and the spring clip 44 pops into the closest hole 42. Movement of the lower section 40 may be required. In this manner, the length of each of the telescoping legs 36 is adjustable.

The spring clip 44 described is known in extendible leg art, and its operation and structure are simplified in order to not obscure the present invention. Other extension mechanisms may be used so that extendible legs may be provided on the convertible grill and fireplace 10. For example, the lower section 40 may alternatively rotate out of the upper section 38. As another example, for each of the legs, a spring clip may be provided on the lower leg instead of the upper leg. In addition, if desired, the legs may adjust to only two settings: an extended setting for the grill configuration, and a retracted setting for the fireplace configuration.

Each of the telescoping legs 36 includes a small tube 46 on a rear, lower edge of the upper section 38. A wire brace 48 extends between the three telescoping legs 36 and includes downwardly extending pins 50. When a user assembles the convertible grill and fireplace 10, the downwardly extending pins 50 are inserted into the small tubes 46 on the back of the telescoping legs 36. As such, the wire brace 48 stabilizes the telescoping legs 36, and provides a small shelf underneath the firebox 14.

The telescoping legs 36 preferably are designed so that they may provide the convertible grill and fireplace 10 at convenient heights for grilling and for use as a fireplace. As one example, in the shown embodiment, the convertible grill and fireplace 10 may in the grill configuration shown in FIG. 1 be 34 inches tall, measured to top of lid handle 24 with telescoping legs 36 extended and the lid 12 in place. In the fireplace configuration shown in FIG. 7, the convertible grill and fireplace 10 may be 37.5 inches tall, measured to top of lid handle 24 with the telescoping legs 36 retracted, the screen assembly 18 in place and the lid 12 on top.

Figure 6:
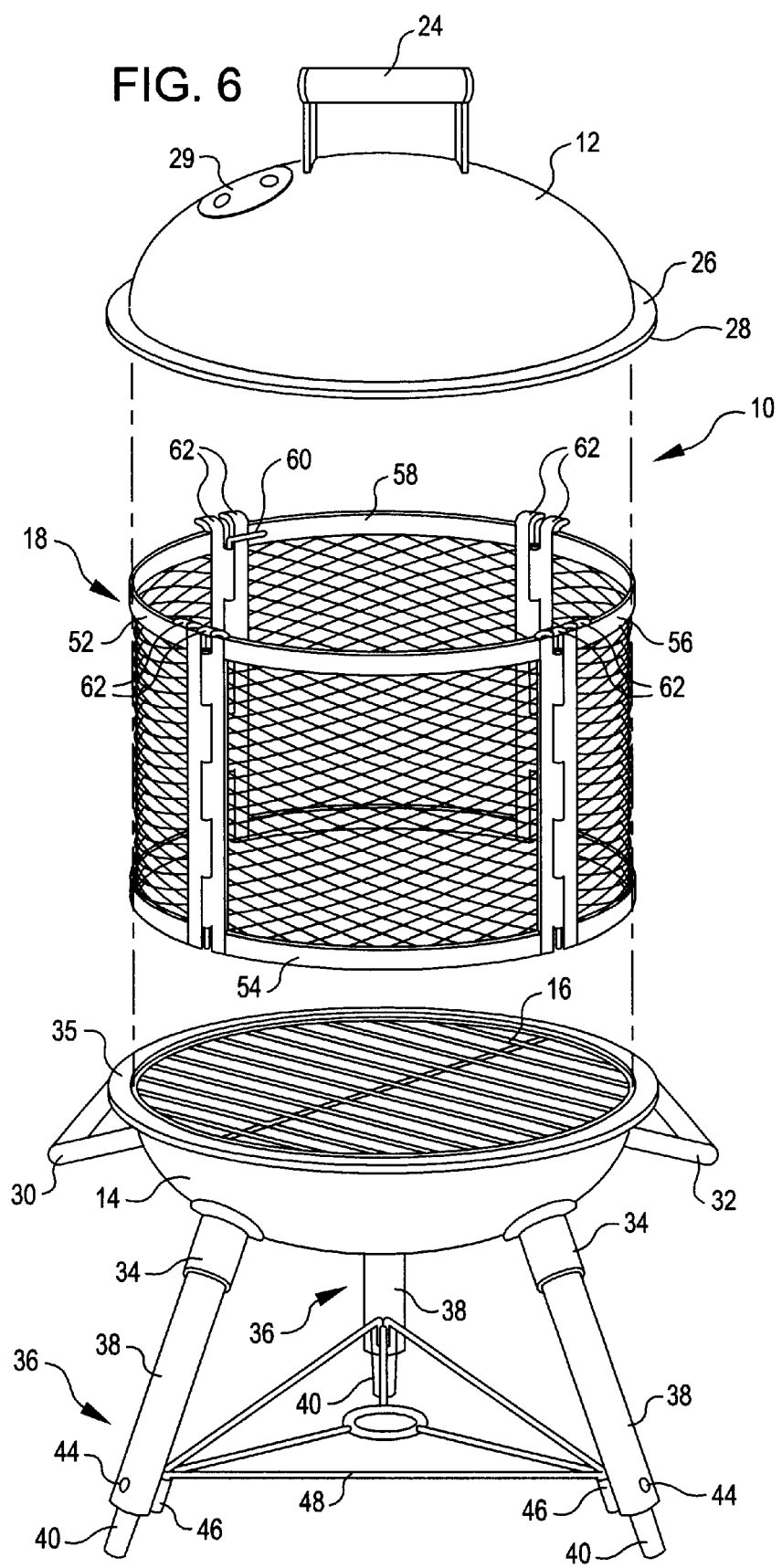
FIG. 6 is an exploded side perspective view of the convertible grill and fireplace of FIG. 1, with the assembled screen assembly in place prior to complete assembly of the convertible grill and fireplace into a fireplace configuration.

In accordance with one aspect of the present invention, the screen assembly 18 has a round or circular cross section when fully assembled. This fully assembled position can be seen in FIGS. 6 and 7. To aid in folding the screen assembly 18, the screen assembly 18 includes first, second, third and fourth panels 52, 54, 56, and 58 having varying lengths. The varied lengths of the panels permit the screen assembly 18 to be folded together into a compact unit.

Figure 3:
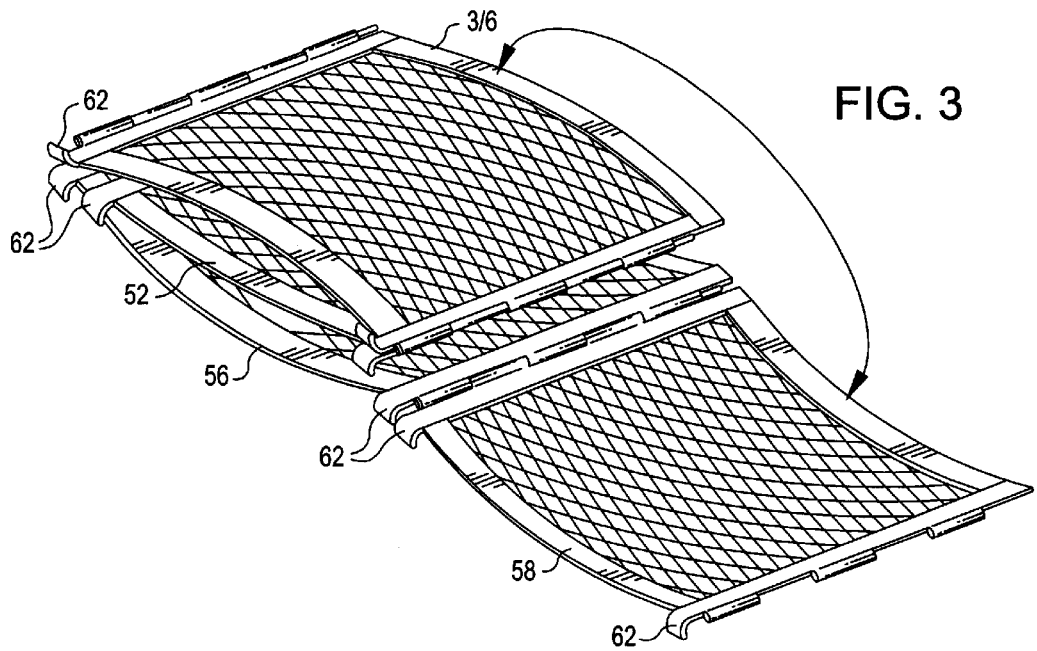
FIG. 3 is a side perspective view of the screen assembly of FIG. 2, showing the screen assembly in a partially folded configuration.
Figure 4:
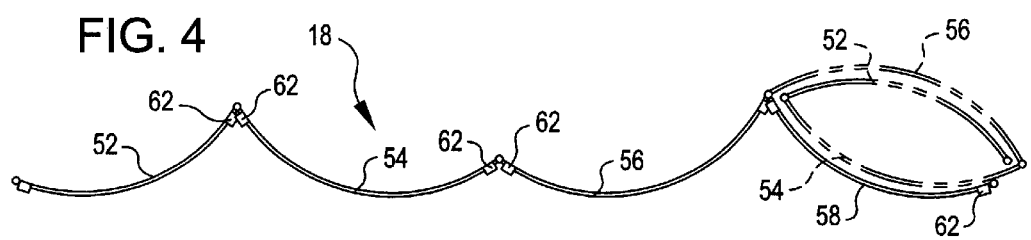
FIG. 4 is a schematic side view of the screen assembly of FIG. 3, shown fully folded out, with a folded up representation of the screen assembly shown in phantom.
Figure 5:
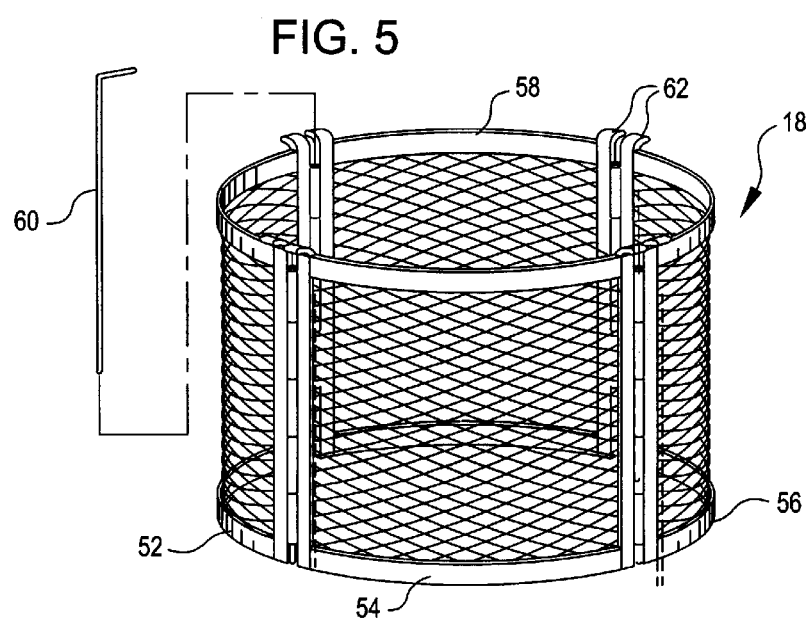
FIG. 5 is a side perspective view of the screen assembly of FIG. 3, showing the screen assembly fully assembled and ready for use in an outdoor fireplace configuration of the convertible grill and fireplace of FIG. 1.

The folding process of the screen assembly 18 is shown in FIGS. 3 and 4. To aid in folding, the first screen panel 52 is shorter than the second screen panel 54. This feature allows the first screen panel 52 to be folded over into the second screen panel 54, without the end of the first screen panel 52 interfering with the end of the second screen panel 54. Because the end of the first screen panel 52 is removed from the end of the second screen panel 54, the third screen panel 56 can fold relative to the second screen panel, without interference from the first screen panel, to a position where the third screen panel extends over the first screen panel 52. Preferably, this third screen panel 56 is longer than the second screen panel 54 so that the end of the third screen panel 56 extends beyond the end of the second screen panel 54 when the third screen panel 56 is folded over first screen panel 52.

Because the third screen panel 56 is longer than the second screen panel 54, the fourth screen panel 58 can be folded relative to the third screen panel, without interference from the first or second screen panels 52, 54, to a position where the fourth screen panel extends over the outside of the second screen panel 54. This configuration of the four screen panels 52, 54, 56, and 58 permits the screen assembly 18 to be folded into a compact configuration, as is shown in phantom in FIG. 4.

The fourth screen panel 58 can be of any length, because it does not need to extend beyond the end of the second or third screen panels 54, 56, but instead may extend any length along the side of the second screen panel 54. However, if desired, the fourth screen panel 58 may be longer than the third screen panel 56, and an additional panel (not shown) may be attached to the end of the fourth screen panel 58. The number of panels may be altered as necessary to permit folding to a particular length or to permit the screen assembly to be folded more compactly.

Figure 2:
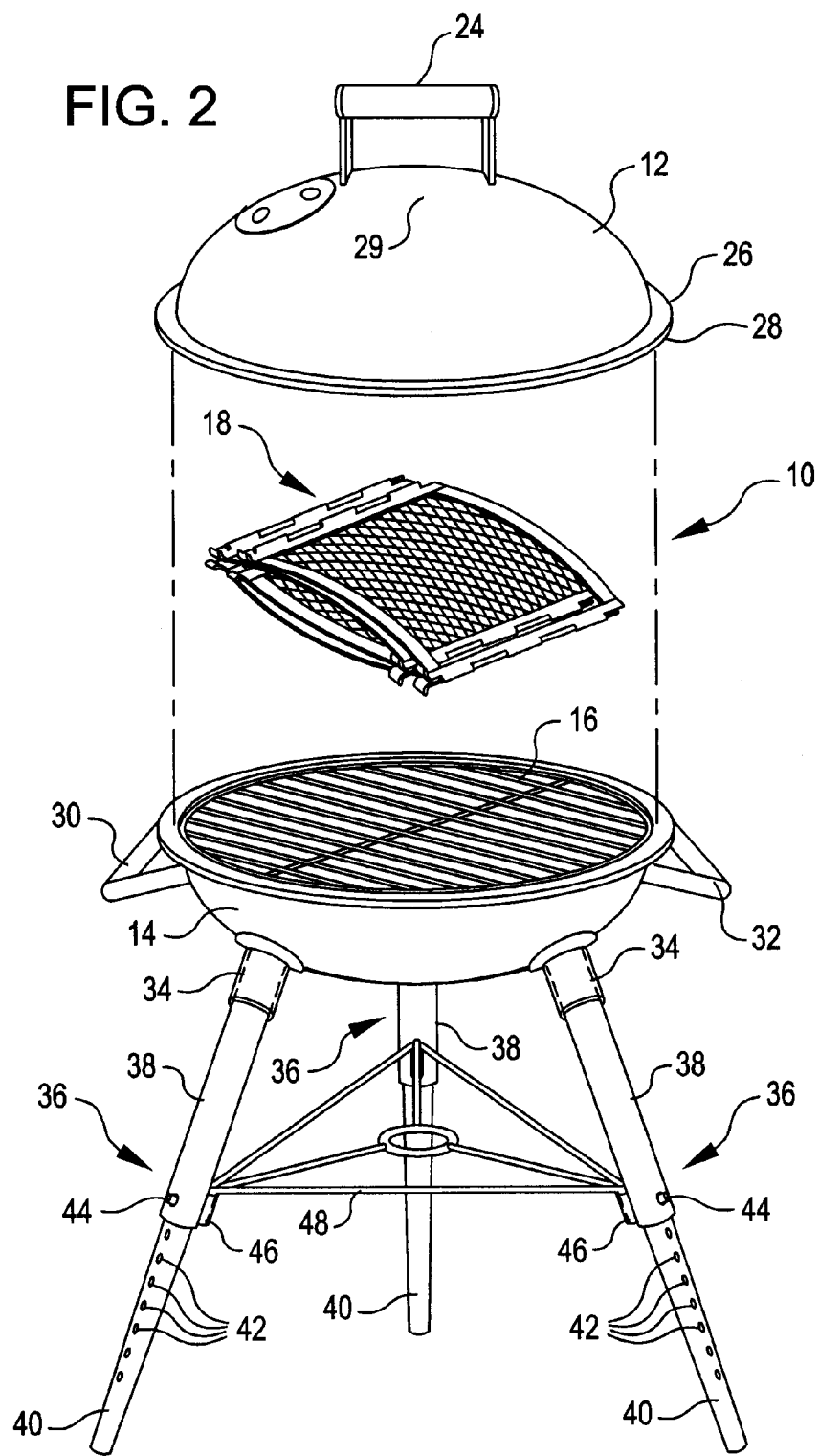
FIG. 2 is a side perspective view of the convertible grill and fireplace of FIG. 1, showing a lid for the convertible grill and fireplace removed and displaying storage of a screen assembly for the convertible grill and fireplace.

The foldable screen assembly 18 is advantageous in that the screen panels 52, 54, 56, and 58 do not have to be detached from one another to fold the screen panel assembly 18 into a compact configuration. Thus, a user may quickly fold the screen assembly 18 together to a size so that it may be placed inside the convertible grill and fireplace 10 during storage, such as is shown in FIG. 2.

The screen assembly 18 is preferably sized so that it may, when fully assembled, fit onto the upper rim 35 of the firebox 14. A pin 60 fits into hinges for the first screen panel 52 and the fourth screen panel 58, securing the ends of the screen assembly 18.

The screen panels 52, 54, 56, and 58 include curled flanges 62 at their top edge. The curled flanges 62 extend upward and outward so as to form flat upper surfaces. In use, when the convertible grill and fireplace 10 is in the fireplace configuration, the rim 26 of the lid 12 sits on top of the curled flanges 62.

The present invention provides many benefits. First, the convertible grill and fireplace 10 may be compactly stored. The screen assembly 18 may be folded as described above, and placed between the firebox 14 and the lid 12. The retractable legs 36 may be removed from the leg receptors 34 and may be fully retracted and stored inside the firebox 14. In addition, the wire brace 48 is preferably sized to fit inside the firebox 14. Thus, the convertible grill and fireplace 10 may be folded to fit inside the firebox 14 and the lid 12, with relatively few removed parts. In this manner, the convertible grill and fireplace 10 may be quickly assembled or disassembled for use or storage.

Figure 8:
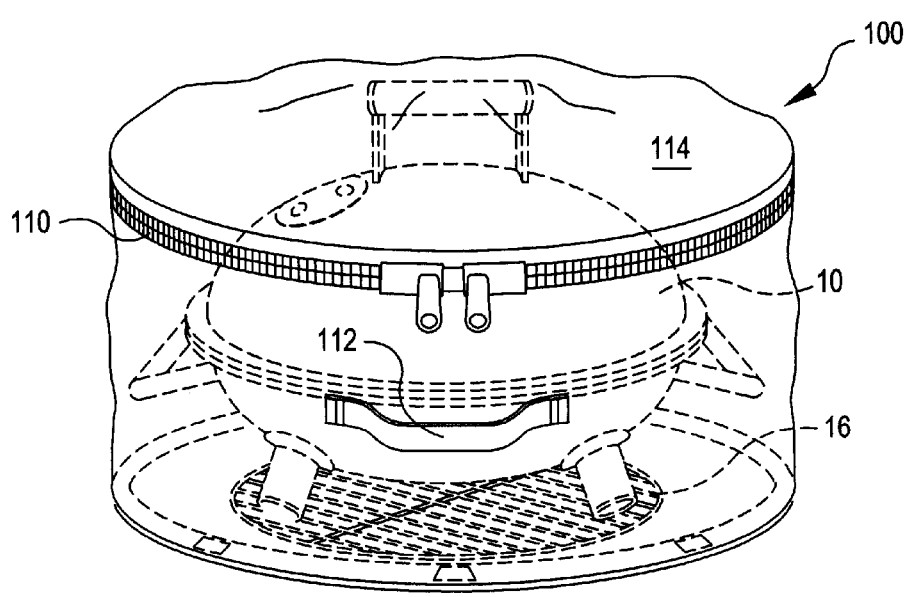
Figure 9:
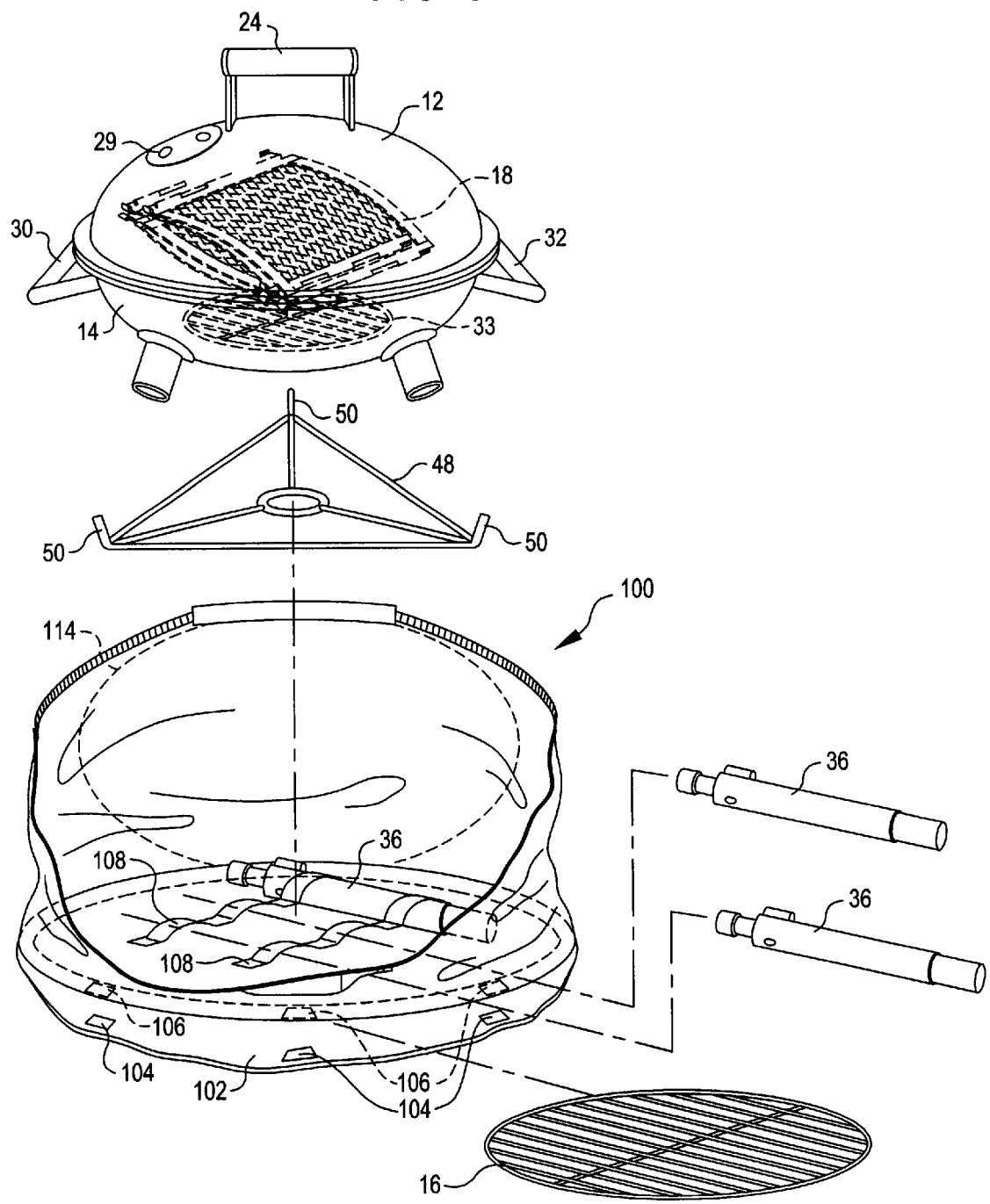

If desired, a carrying case may be provided for storing and transporting the compacted convertible grill and fireplace 10. An example of a carrying case 100 is shown in FIGS. 8 and 9. The carrying case 100 includes a lower flap 102 that, with a bottom panel of the carrying case 100 forms a pocket. As shown in FIGS. 8 and 9, the cooking grate 16 may be stored in the pocket formed by the flap 102, and may be secured in position, for example by hook and loop fasteners 104, 106. By keeping the cooking grate 16 separate from the rest of the convertible grill and fireplace 10, the pocket protects the cooking grate from soiling and damage.

The carrying case 100 may also include elastic straps 108 on the inside of the bottom panel. If desired, the telescoping legs 36 may be retracted and hooked into these elastic straps 108 to prevent movement of the telescoping legs during transport. Alternatively, if desired, the telescoping legs 36 may be retracted and stored inside the firebox 14, as previously described. However, by storing the telescoping legs 36 outside the firebox 14, the legs avoid soiling or damage.

The wire brace 48 may be inverted (i.e., pins 50 up) and stored on top of the telescoping legs 36. The collapsed firebox 14 and lid 12, with the screen assembly and the charcoal grate therein, may then be placed on top of the wire brace 48 within the carrying case 100. The screen assembly 18 and the charcoal grate 33 usually get the greatest amount of grime, so storing these items inside the firebox 14 and lid 12 prevents soiling of the carrying bag 100.

After all items are in the bag, a zipper 110 or other closure mechanism may be closed, causing a top 114 of the carrying case 100 to be closed over the convertible grill and fireplace 10. The convertible grill and fireplace 10 may then be transported in the carrying case 100, for example by carrying the case via a handle 112.

The convertible grill and fireplace 10 is also convenient in that it can be used either as a grill or as a fireplace. As described above, the convertible grill and fireplace 10 is reconfigurable between a grill configuration in which the lid 12 fits directly on top of the firebox 14, and a fireplace configuration in which the screen assembly 18 fits between the lid 12 and the firebox 14. Moreover, the retractable legs 36 permit the convertible grill and fireplace 10 to be adjusted to multiple different heights. In this manner, when the convertible grill and fireplace 10 is in the grill configuration, the grill surface may be provided at a convenient, usually higher, level for a user. In addition, when the convertible grill and fireplace 10 is in the fireplace configuration, the firebox 14 may be arranged at a convenient, usually lower level.

The round shape of the embodiment shown in the drawings is convenient in that a fire in the firebox 14 may evenly heat a large portion of the cooking grate 16. In addition, the round shape has an aesthetically pleasing appearance, and can be compactly stored as described above. Although described with reference to a round shape, the aspects of the present invention may be applied to grills and/or fireplaces having multiple different configurations, including rectangular, square, or multiple other polygons.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A grill, comprising:
   a firebox;
   a lid that fits onto the firebox; and
   a round, removable screen assembly that fits between the lid and the firebox, the round removable screen assembly being configured so that it may be folded into a compact arrangement, independent of detaching portions of the screen assembly, so that the compact arrangement may fit inside the lid and the firebox when the lid is placed onto the firebox.

2. The grill of claim 1, further comprising a cooking grate configured to fit at a top of the firebox.

3. The grill of claim 1, further comprising extendible legs on the firebox.

4. The grill of claim 3, wherein each of the legs comprises an upper section attachable to the firebox, and a lower section that is configured to extend relative to the upper section.

5. The grill of claim 4, wherein, for each leg, when the lower section is extended relative to the upper section, the leg does not fit within the firebox and the lid, and wherein, for each leg, the lower section may be retracted relative to the upper section so that leg, independent of detaching the upper section from the lower section, may fit inside the lid and the firebox when the lid is placed onto the firebox.

6. The grill of claim 3, wherein each leg, when extended, does not fit inside the lid and the firebox when the lid is placed onto the firebox, and wherein, each leg may be retracted, independent of detaching a portion of the leg, so that the leg may fit inside the lid and the firebox when the lid is placed onto the firebox.

7. The grill of claim 1, wherein the screen assembly comprises a plurality of panels, each of which is rounded, and that fold into one another in the compact arrangement.

8. The grill of claim 7, wherein the plurality of panels comprises at least some of the plurality being successive panels that are shorter in length.

9. The grill of claim 8, wherein the plurality of panels comprises a first panel, a second panel rotatably attached along one end to an end of the first panel and along an opposite end to a third panel, and a fourth panel rotatably attached to the third panel, the first panel being shorter than the second panel, and the third panel being shorter than the second panel.

10. The grill of claim 7, wherein the plurality of panels comprise flanges that are attached to the top edges of at least some of the panels and which are arranged to receive the lid.

11. A grill, comprising:
    a firebox;
    a lid that fits onto the firebox in a first configuration;
    a removable screen assembly that fits between the lid and the firebox in a second configuration; and
    extendible legs removably attachable to the bottom of the firebox wherein each leg, when extended, does not fit inside the lid and the firebox when in the first configuration, and wherein, each leg may be retracted, independent of detaching a portion of the leg, so that the leg may fit inside the lid and the firebox when in the first configuration.

12. The grill of claim 11, wherein the screen assembly is configured so that it may be folded into a compact arrangement so that the compact arrangement may fit inside the lid and the firebox when the lid is placed onto the firebox.

13. The grill of claim 11, wherein each of the legs comprises an upper section attachable to the firebox, and a lower section that is configured to extend relative to the upper section, and wherein, when a lower section is extended relative to a upper section, the leg does not fit within the firebox and the lid, and wherein, for each leg, the lower leg section may be retracted relative to the upper section so that leg, independent of detaching the upper section from the lower section, may fit inside the lid and the firebox when the lid is placed onto the firebox.

14. The grill of claim 13, further comprising a carrying case for receiving the grill and the firebox when the lid is placed onto the firebox.

15. The grill of claim wherein the carrying case includes a separate portion for storing a cooking grate for the grill.

16. The grill of claim 15, wherein the separate portion of the carrying case comprises a pocket.

17. The grill of claim 14, wherein the carrying case includes a handle.

18. The grill of claim 14, wherein the carrying case includes a holding mechanisms for the extendible legs.

19. The grill of claim 18, wherein the holding mechanism comprises elastic bands.

20. The grill of claim 11, further comprising a wire rack extending between the legs.

21. The grill of claim 11, further comprising a cooking grate configured to fit at a top of the firebox.

22. The grill of claim 11, further comprising a carrying case for receiving the grill and the firebox when the lid is placed onto the firebox.

23. A grill, comprising:
a firebox;
a lid that fits onto the firebox;
a removable screen assembly that fits between the lid and the firebox, wherein the screen assembly comprises a plurality of panels, each of which is rounded, and at least some of the panels being successively shorter in length so that the panels may fold into one another in a compact arrangement.

24. The grill of claim 2 wherein the plurality of panels comprises a first panel, a second panel rotatably attached along one end to an end of the first panel and along an opposite end to a third panel, and a fourth panel rotatably attached to the third panel, the first panel being shorter than the second panel, and the third panel being shorter than the second panel.

25. The grill of claim 2 wherein the plurality of panels comprise flanges that are attached to the top edges of at least some of the panels and which are arranged to receive the lid.

26. The grill of claim 1, further comprising a carrying case for receiving the grill and the firebox when the lid is placed onto the firebox.

27. The grill of claim 26, wherein the carrying case includes a separate portion for storing a cooking grate for the grill.

28. The grill of claim 27, wherein the separate portion of the carrying case comprises a pocket.

29. The grill of claim 26, wherein the carrying case includes a handle.

* * * * *